United States Patent
Yang et al.

(10) Patent No.: US 10,073,466 B2
(45) Date of Patent: Sep. 11, 2018

(54) DUAL-REDUNDANCY FLIGHT CONTROL SYSTEM

(71) Applicant: ZERO UAV (BEIJING) INTELLIGENCE TECHNOLOGY CO., LTD., Beijing (CN)

(72) Inventors: Jianjun Yang, Beijing (CN); Hongtao Sun, Beijing (CN)

(73) Assignee: Zerotech (Beijing) Intelligence Technology Co. Ltd., Beijing (CN)

( * ) Notice: Subject to any disclaimer, the term of this patent is extended or adjusted under 35 U.S.C. 154(b) by 0 days.

(21) Appl. No.: 15/129,928

(22) PCT Filed: Apr. 21, 2015

(86) PCT No.: PCT/CN2015/077086
§ 371 (c)(1),
(2) Date: Sep. 28, 2016

(87) PCT Pub. No.: WO2015/161784
PCT Pub. Date: Oct. 29, 2015

(65) Prior Publication Data
US 2017/0147006 A1    May 25, 2017

(30) Foreign Application Priority Data
Apr. 22, 2014    (CN) .................... 2014 2 0197623 U

(51) Int. Cl.
*G05D 1/08* (2006.01)
*G05D 1/00* (2006.01)
(Continued)

(52) U.S. Cl.
CPC ......... *G05D 1/0816* (2013.01); *B64C 39/024* (2013.01); *G01S 19/39* (2013.01);
(Continued)

(58) Field of Classification Search
CPC .... G05D 1/0816; G05D 1/007; G05D 1/0022; G05D 1/101; G01S 19/39; B64C 39/024
(Continued)

(56) References Cited

U.S. PATENT DOCUMENTS

| | | | |
|---|---|---|---|
| 8,570,192 B2 * | 10/2013 | McLoughlin | B64D 45/00 340/945 |
| 9,482,552 B2 * | 11/2016 | Dabrowski | G01C 23/00 |
| 2017/0045892 A1 * | 2/2017 | Wang | G05D 1/10 |

FOREIGN PATENT DOCUMENTS

| | | |
|---|---|---|
| CN | 101515178 A | 8/2009 |
| CN | 202583865 U | 12/2012 |

(Continued)

OTHER PUBLICATIONS

International Search Report, dated Jul. 6, 2015 (PCT/CN2015/077086).

*Primary Examiner* — Yazan A Soofi
(74) *Attorney, Agent, or Firm* — Robert L. Stearns; Dickinson Wright, PLLC

(57) ABSTRACT

A dual-redundancy flight control system, comprises a master control system and a secondary control system. The master control system comprises a master controller, and further comprises a first inertial measurement unit (IMU), a first magnetic compass unit, and a first satellite navigation unit, each of which being connected to the master controller respectively. The secondary control system comprises a secondary controller, and further comprises a second IMU, a second magnetic compass unit, and a second satellite navigation unit, each of which being connected to the secondary controller respectively. The secondary controller is connected to the master controller via a data bus, and the master controller is connected to an electronic speed regulator of an aircraft for controlling the flight actions of the aircraft.

11 Claims, 3 Drawing Sheets

(51) Int. Cl.
G01S 19/39 (2010.01)
B64C 39/02 (2006.01)
G05D 1/10 (2006.01)

(52) U.S. Cl.
CPC ......... G05D 1/0022 (2013.01); G05D 1/0077 (2013.01); G05D 1/101 (2013.01); *B64C 2201/141* (2013.01)

(58) Field of Classification Search
USPC .............................. 701/2, 3, 30.2, 31.1, 501
See application file for complete search history.

(56) References Cited

FOREIGN PATENT DOCUMENTS

| | | | |
|---|---|---|---|
| CN | 102915038 | A | 2/2013 |
| CN | 103529692 | A | 1/2014 |
| CN | 203786564 | U | 8/2014 |
| EP | 2381322 | A2 | 10/2011 |

\* cited by examiner

DUAL-REDUNDANCY FLIGHT CONTROL SYSTEM

This U.S. National Phase claims priority to International PCT application number PCT/CN2015/077086, filed Apr. 21, 2015, which claims priority to Chinese Patent Application No. 201420197623.8 filed Apr. 22, 2014, both of which are incorporated by reference herein in their entirety.

BACKGROUND OF THE INVENTION

1. Technical Field

The present utility invention relates to the field of flight control and, in particular, to a dual-redundancy flight control system.

2. Related Art

The flight control system, which is an important component for an aircraft, can be equipped with flight control algorithms and can control the flight actions for the aircraft. The flight control system mainly has two functions. The first one is flight control, including controlling the flight attitudes of an aircraft in the air and keeping the flight paths stable, as well as changing the flight attitudes and flight paths according to the altitude, flight path, flight direction, attitude angle etc. on the basis of instructions remotely instructed by radio from the ground station or set up in advance, thereby ensure the stable and smart flight of the aircraft, e.g., automatic pilot. The second one is the flight management, including gathering parameters of flight status, computing navigation paths, transmitting measured data, diagnosing and dealing with malfunctions, emergent situations, controlling and managing loaded equipments etc.

The present flight control systems mostly use independent sensors to gather the flight data. After the flight control system has received the flight data from the sensors, a control signal, which is computed by attitude algorithms, will be output to control the flight of the aircraft. However, it's common for these sensors to have problems when being interfered by other electronic devices. In addition, the corresponding wires can be loosened due to vibration occurred during a flight. All these conditions may make the flight control system encounter a malfunction, and result in the circumstances of damaging the aircraft, such as an explosion. Therefore, the present flight control systems have lower reliability and safety on this aspect.

SUMMARY

In order to solve the technical problem above, the present utility invention proposes a more stable and safer flight control system, and the technical solution is as follows:

A dual-redundancy flight control system, comprising: a master control system, comprising a master controller, and a first inertial measurement unit (IMU), a first magnetic compass unit, and a first satellite navigation unit, each of which being connected to the master controller respectively; a secondary control system, comprising: a secondary controller, and a second IMU, a second magnetic compass unit, and a second satellite navigation unit each of which being connected to the secondary controller respectively; wherein the secondary controller is connected to the master controller via a data bus, and the master controller is connected to an electronic speed regulator of an aircraft for controlling the flight actions of the aircraft.

According to one embodiment, the master controller outputs a PWM square-wave signal to the electronic speed regulator for controlling the flight actions of the aircraft.

Further, the master controller is connected to a load device mounted on the aircraft for controlling the actions of the load device.

Further, the master controller is connected to a remote-control signal receiver of the aircraft.

According to one embodiment, each of the first and second satellite navigation units comprises a GPS navigation module and/or a Compass navigation module, respectively.

Preferably, the master controller further comprises a first, second, and third circuit boards arranged in parallel to one another, wherein the first IMU and the first magnetic compass unit are mounted on the second circuit board; the first and third circuit boards are connected at two ends thereof via wirings or plugins, and the second and third circuit boards are connected via a flexible signal line.

Further, the master control system further comprises: a first and second weight-loading boards arranged in parallel with each other, and the second circuit board is arranged in parallel to, and between the first and second weight-loading boards; wherein the first weight-loading board, the second circuit board and the second weight-loading board are sequentially fixed together to form an integral structure.

Further, the master control system further comprises: a first and second cushion pads; and wherein the first circuit board, the first cushion pad, the integral structure, the second cushion pad, and the third circuit board are sequentially bonded.

Preferably, the secondary controller comprises: a fourth, fifth, and sixth circuit boards arranged in a parallel to one another, wherein the second IMU and the second magnetic compass unit are mounted on the fifth circuit board; and the fourth and sixth circuit boards are connected at two ends thereof via wirings or plugins, and the fifth and sixth circuit boards are connected via a flexible signal line.

Further, the secondary control system further comprises a third and fourth weight-loading boards in parallel with each other, and the fifth circuit board is arranged in parallel to, and between the third and fourth weight-loading boards; wherein the third weight-loading board, the fifth circuit board and the fourth weight-loading board are sequentially fixed together to form a second integral structure.

Further, the secondary control system further comprises a third and fourth cushion pads; wherein the fourth circuit board, the third cushion pad, the second integral structure, the fourth cushion pad, and the sixth circuit board are sequentially bonded.

The dual-redundancy flight control system disclosed by the present utility invention comprises a master control system and a secondary control system, comprising two sets of sensors. The master control system and the secondary control system are linked together via a data bus, so as to ordinarily back-up for each other. When one sensor (e.g. IMU, magnetic compass, GPS unit) of the master or secondary controller breaks down, the same sensor of the other controller will be automatically switched for work. The system is capable of ensuring the control over the flight of the aircraft without manual intervention, thereby significantly reducing the aircraft accidents and improving the safety and reliability.

These and other features and advantages of the present utility invention may be clearly understood with reference to the following drawings and the detailed description of the embodiments.

BRIEF DESCRIPTION OF THE DRAWINGS

The drawings, which constitute a part of the specification, are used to illustrate the embodiments of the present utility invention, as well as explain the principle of the present utility invention along with the specification.

DETAILED DESCRIPTION

Figure 1:
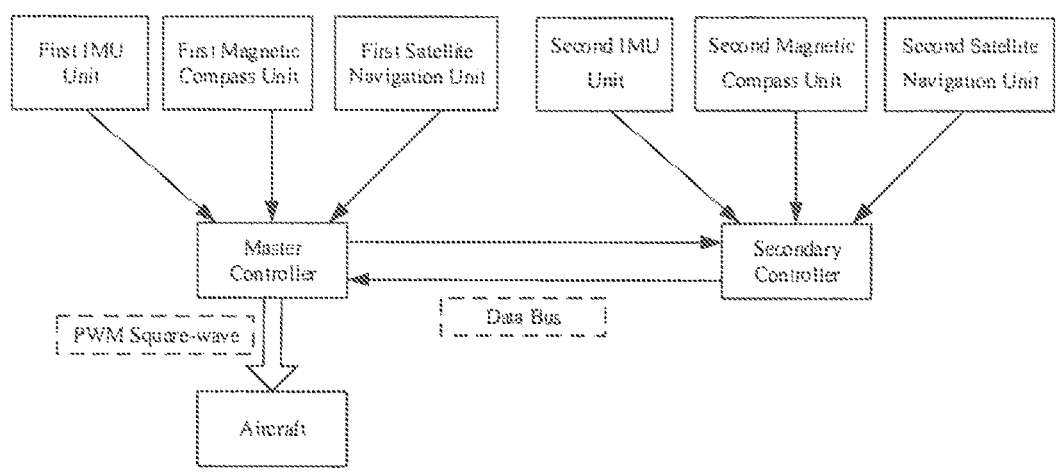
FIG. 1 is a diagram of a dual-redundancy flight control system according to the present utility invention.

Various features of the present utility invention are described hereinafter with reference to the drawings. It should be noted that, unless specifically indicated, the relative arrangement of the components and steps, numerical expressions and values recited in the embodiments are not intended to limit the scope of the present utility invention.

The description of at least one embodiment hereinafter is illustrative, and has no reason to be used as a limitation to the application or use of the present utility invention.

Known techniques and equipment for a person skilled in the art may not be discussed in detail, whereas they shall be regarded as a part of this specification where appropriate.

Any particular values in the embodiments illustrated or discussed herein should be explained for an illustrative purpose, rather than a limitation. Therefore, other exampled embodiments shall have different values.

It should be noted that, similar components are represented by similar reference numerals throughout the drawings below. Once an item is defined in a drawing, it may not be discussed any more in the subsequent drawings.

The aircraft is equipped with a plurality of motors, and is capable of controlling the flight status by adjusting the motor speed. The flight control system mainly has two functions for the aircraft. The first one is flight control, including controlling the flight attitudes of an aircraft in the air and keeping the flight paths stable, as well as changing the flight attitudes and flight paths according to the altitude, flight path, flight direction, attitude angle etc. on the basis of instructions remotely instructed by radio from the ground or set up in advance, thereby ensure the stable flight of the aircraft, namely the automatic pilot. The second one is flight management, including gathering parameters of flight status, computing navigation paths, transmitting measured data, diagnosing and dealing with the malfunctions, emergent situations, controlling and managing loaded equipments etc. Therefore, the performance of the flight control system is directly related to the safe and stable flight of the aircraft FIG. 1 shows an embodiment according to the present utility invention, comprising: a master control system and a secondary control system. Said master control system comprises: a master controller, and a first inertial measurement unit (IMU), a first magnetic compass unit, and a first satellite navigation unit, each of which being connected to the master controller respectively. Said secondary control system comprises: a secondary controller, and a second it a second magnetic compass unit, and a second satellite navigation unit, each of which being connected to the secondary controller respectively. Further, the secondary controller is connected to the master controller via a data bus, and the master controller is connected to an electronic speed regulator of an aircraft for controlling flight actions of the aircraft.

Figure 2:
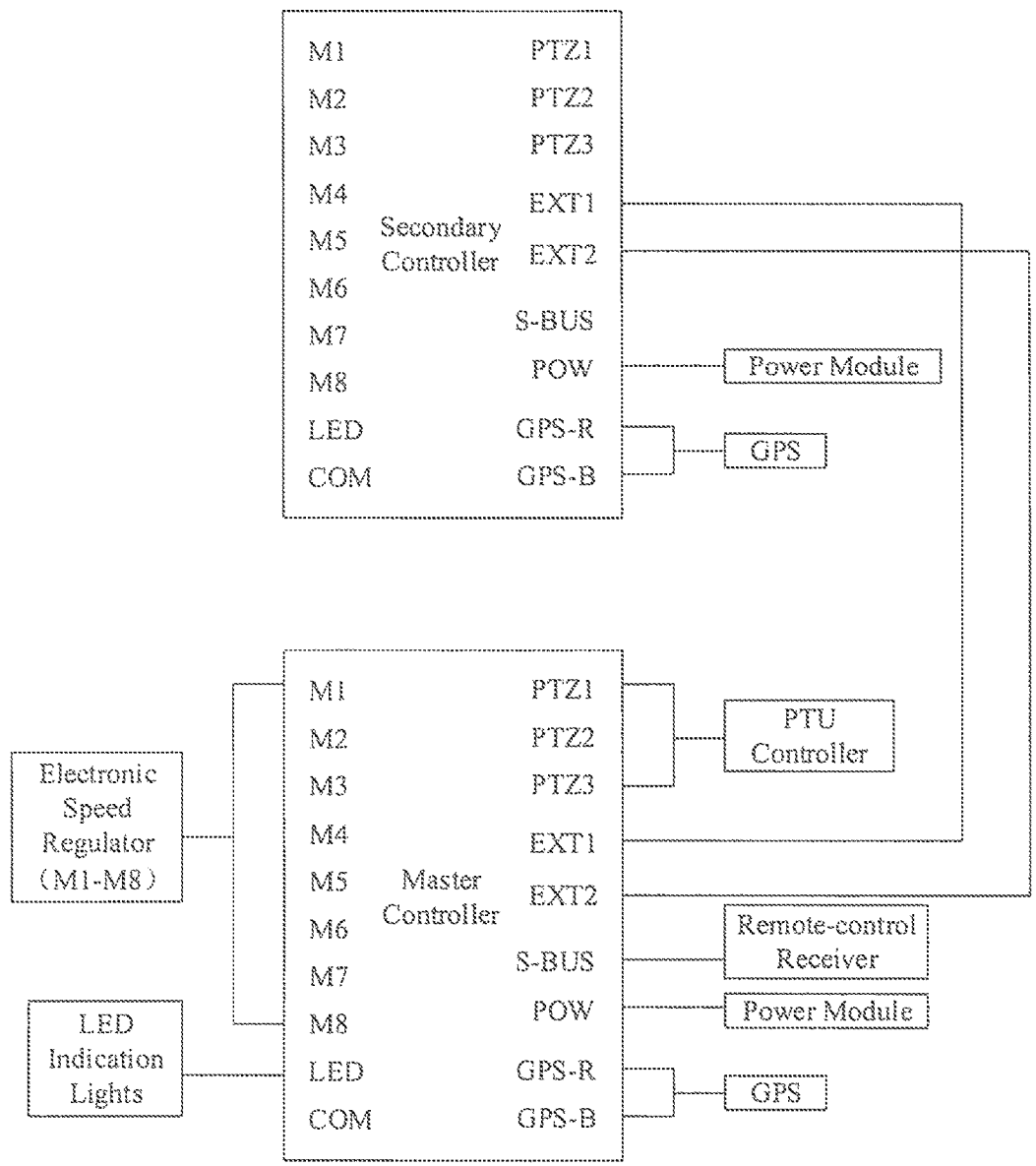
FIG. 2 is a circuit diagram of a dual-redundancy flight control system according to the present utility invention.

FIG. 2 shows a circuit diagram according to the present utility invention. It can be seen from the diagram that, output ports M1-M8 of the master controller are connected to an electronic speed regulator for controlling fight actions of the aircraft. Specifically, the master controller can output PWM square-wave signal to the electronic speed regulator for controlling flight actions of the aircraft.

GPS ports of the master and secondary controllers are connected to GPS navigation modules, such as GPS receivers, respectively. Alternatively, Compass navigation modules, or dual-navigation modules with both OPS and Compass, can be used in other embodiments.

The secondary controller is connected to the master controller via a data bus. Both controllers mutually transmit and backup flight data measured and output by the first and second IMUs, the first and second magnetic compass units, and the first and second satellite navigation units.

The output ports of the master controller are also connected to respective load devices of the aircraft for controlling actions of the bad devices. As shown in the present embodiment, output ports PTZ1-PTZ3 of the master controller are connected to a Pan-Tilt Unit (PTU)loaded on the aircraft for controlling, e.g., the actions and attitudes of video camera supported by the PTU. Specifically, the master controller outputs PWM square-wave signal to the PTU for controlling the flight actions thereof.

The master controller is connected to a Wi-Fi module of the aircraft for supporting the communication between the aircraft and the ground station, thereby synchronously or periodically saving flight data of the aircraft to the ground station for replaying the flight path and analyzing the flight data.

The output ports of the master controller are also connected to LED indication lights of the aircraft for indicating working status of the aircraft. The master controller is connected to a remote-control signal receiver of the aircraft for receiving remote-control instructions and making corresponding controls.

The processing flow of operating the dual-redundancy flight control system according to the present utility invention is as follows. The master controller will process and analyze the data of three-dimension acceleration and three-axis angular velocity measured by IMUs, the data of flight direction measured by magnetic compass units, so as to conduct the attitude control: the master controller will also process the data of longitude and latitude, height, and speed measured by satellite signals so as to compute and adjust flight positions. Both the master and secondary sets of the independent IMU, magnetic compass and satellite navigation units can be switched by each other. When the aircraft is flying in the air, data transmitted by the two sets of sensors is collectively processed by the dual-redundancy flight controller. When any of the sensors is judged as having a malfunction or error, the backup device will be automatically and seamlessly switched for use. In the meantime, users will be warned of such malfunction or error. Accordingly, the failure rate of the system could be reduced dramatically, and thus the stability and reliability of the system is significantly improved.

The connection manner shown in the circuit of FIG. 2 is illustrative only, and thus the specific positions of the ports, the number of wirings and the external devices are not limited to the specific manner in FIG. 2. Any variation according to the conception of the present utility invention, or any modified equivalents should fall into the protection scope of the present utility patent.

Figure 3:
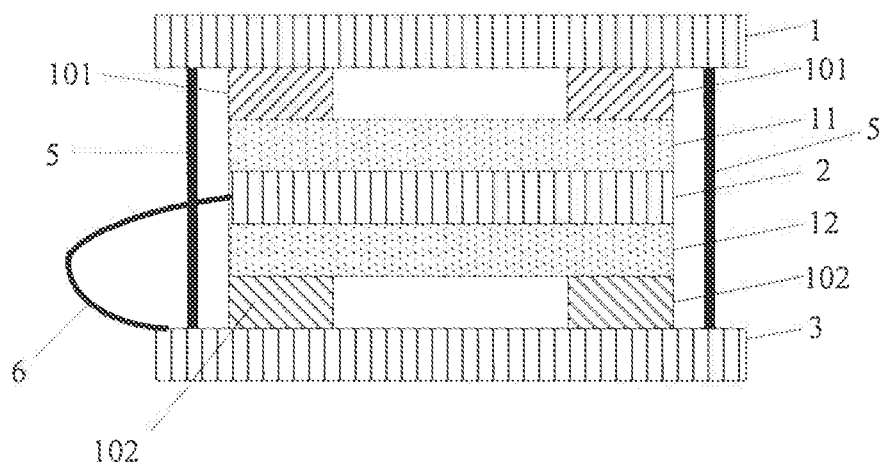
FIG. 3 is a structure diagram of a master control system according to the present utility invention.

FIG. 3 shows a structure diagram of a master control system according to the present utility invention. The master controller comprises a first circuit board 1, a second circuit board 2, and a third circuit board 3, all of which are arranged in parallel to one another. The first IMU and the first magnetic compass unit are mounted on the second circuit board 2. The first and third circuit boards 1, 3 are connected at both ends thereof via wirings 5 (or other typical arrangement such as terminals/plugins). The second and third circuit boards 2, 3 are connected via a flexible signal line 6. The master control system further comprises: a first weight-loading board 11 and a second weight-loading board 12 arranged in parallel with each other, and the second circuit board 2 is arranged in parallel to, and between the first and second weight-loading boards 11, 12. The first weight-loading board 11, the second circuit board 2 and the second weight-loading board 12 are sequentially fixed together, e.g., being bonded or other physical processing, so as to form an integral structure. The master control system further comprises: a first cushion pad 101 and a second cushion pad 102. Said first circuit board 1, the first cushion pad 101, the integral structure, the second cushion pad 102, and the third circuit board 3 are sequentially bonded together.

According to one embodiment of the present invention, the secondary control system can be implemented as the same or similar structure of the master control system. The detailed description will be omitted here.

The controller of the present utility invention comprises three circuit boards. IMUs, magnetic compass units etc., which require high vibration performance, are integrated in the second circuit board. The weight-loading boards and cushion pads are provided and arranged in a way to reduce the vibration effect, thereby enhance the stability for measurement.

The dual-redundancy flight control system disclosed by the present utility invention comprises the master control system and the secondary control system. It provides two sets of independent sensors. The master controller is connected with motors and various modules, cooperates with the external electronic devices, so as to achieve automatic flight control of the aircraft. The master control system and the secondary control system are coupled together via a data bus, so as to regularly prepare back-up for each other. When one sensor (e.g. IMU, magnetic compass, GPS unit) of the master or secondary controller stops working, the corresponding sensor of the other controller will automatically and seamlessly switch into work. In cases of sensor malfunction, the proposed system is capable of flight control of the aircraft without manual intervention, thereby significantly reducing the aircraft accidents and improving the safety and reliability.

While detailed description is recited with reference to some examples for the specific embodiments of the present utility invention, it should be understood by a person skilled in the art that, the foregoing embodiments are merely illustrative, rather than for limiting the scope of the present utility invention. It should be understood by a person skilled in the art that, the foregoing embodiments can be modified under the scope and spirit of the present utility invention. The scope thereof is determined by the claims attached.

What is claimed is:

1. A dual-redundancy flight control system, comprising:
   a master control system, comprising
   a master controller, and
   a first inertial measurement unit (IMU), a first magnetic compass unit, and a first satellite navigation unit, each of which being connected to the master controller respectively;
   a secondary control system, comprising:
   a secondary controller, and
   a second IMU, a second magnetic compass unit, and a second satellite navigation unit, each of which being connected to the secondary controller respectively;
   wherein the secondary controller is connected to the master controller via a data bus, and
   the master controller is connectable to an electronic speed regulator of an aircraft for controlling the flight actions of the aircraft.

2. The system of claim 1, wherein the master controller outputs a PWM square-wave signal to the electronic speed regulator for controlling the flight actions of the aircraft.

3. The system of claim 1, wherein the master controller is connectable to a load device mounted on the aircraft for controlling the actions of the load device.

4. The system of claim 1, wherein the master controller is connectable to a remote-control signal receiver of the aircraft.

5. The system of claim 1, wherein each of the first and second satellite navigation units comprises a OPS navigation module and/or a Compass navigation module, respectively.

6. The system of claim 1, wherein the master controller further comprises a first, second, and third circuit boards arranged in parallel to one another, wherein
   the first IMR and the first magnetic compass unit are mounted on the second circuit board;
   the first and third circuit boards are connected at both ends thereof via wirings, and
   the second and third circuit boards are connected via a flexible signal line.

7. The system of claim 6, wherein the master control system further comprises:
   a first and second weight-loading boards arranged in parallel with each other, and the second circuit board is arranged in parallel to, and between the first and second weight-loading boards;
   wherein the first weight-loading board, the second circuit board and the second weight-loading board are sequentially fixed together to form an integral structure.

8. The system of claim 7, wherein the master control system further comprises:
   a first and second cushion pads; and
   wherein the first circuit board, the first cushion pad, the integral structure, the second cushion pad, and the third circuit board are sequentially bonded.

9. The system of claim 1, wherein the secondary controller comprises: a fourth, fifth, and sixth circuit boards arranged in a parallel to one another,
   wherein the second MI and the second magnetic compass unit are mounted on the fifth circuit board; and
   the fourth and sixth circuit boards are connected at both ends thereof via wirings, and the fifth and sixth circuit boards are connected via a flexible signal line.

10. The system of claim 9, wherein the secondary control system further comprises a third and fourth weight-loading boards in parallel with each other, and
    the fifth circuit board is arranged in parallel to, and between the third and fourth weight-loading boards;
    wherein the third weight-loading board, the fifth circuit hoard and the fourth weight-loading board arc sequentially fixed together to form a second integral structure.

11. The system of claim 10, wherein the secondary control system further comprises a third and fourth cushion pads;
    wherein the fourth circuit board, the third cushion pad, the second integral structure, the fourth cushion pad, and the sixth circuit board are sequentially bonded.

\* \* \* \* \*

UNITED STATES PATENT AND TRADEMARK OFFICE
CERTIFICATE OF CORRECTION

PATENT NO. : 10,073,466 B2  
APPLICATION NO. : 15/129928  
DATED : September 11, 2018  
INVENTOR(S) : Jianjun Yang and Hongtao Sun Page 1 of 1

It is certified that error appears in the above-identified patent and that said Letters Patent is hereby corrected as shown below:

In the Specification

Column 3, Line 48, "aircraft" should read --aircraft.--

Column 3, Line 56, "a second it a" should read --a second IMU, a--

Column 4, Line 7, "OPS" should read --GPS--

Column 4, Line 11, "backup" should read --back-up--

Column 4, Line 41, "control:" should read --control;--

Column 4, Line 50, "backup" should read --back-up--

In the Claims

Column 6, Line 18, Claim 5 "OPS" should read --GPS--

Column 6, Line 23, Claim 6 "IMR" should read --IMU--

Column 6, Line 47, Claim 9 "MI" should read --IMU--

Column 6, Line 58-59, Claim 10 "hoard and the fourth weight-loading board arc sequentially fixed together to form a second integral structure." should read --board and the fourth weight-loading board are sequentially fixed together to form a second integral structure.--

Signed and Sealed this  
Thirtieth Day of July, 2019

Andrei Iancu  
*Director of the United States Patent and Trademark Office*